Nov. 23, 1965  R. M. FOECKING ETAL  3,219,485
PORTABLE POWER PACK OF RECHARGEABLE ALKALINE BATTERIES
Filed Dec. 21, 1962                                    2 Sheets-Sheet 1
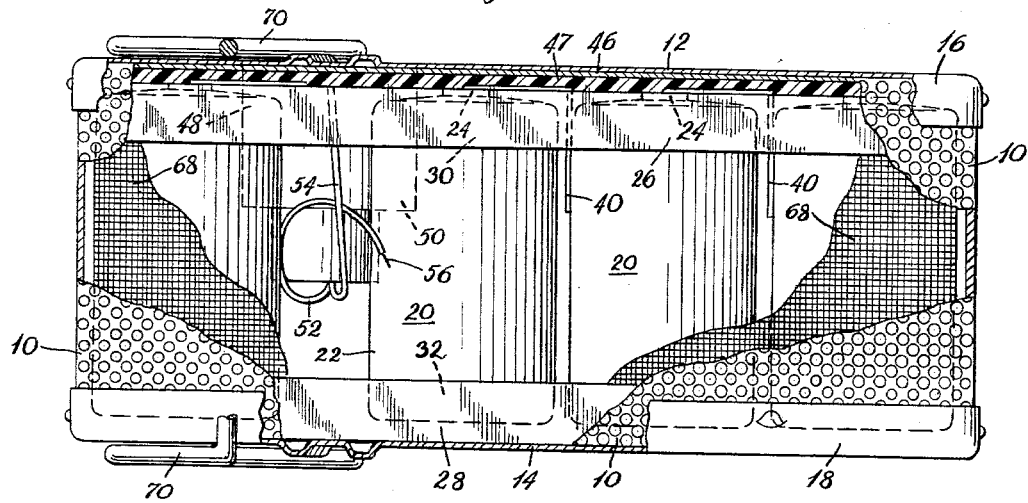
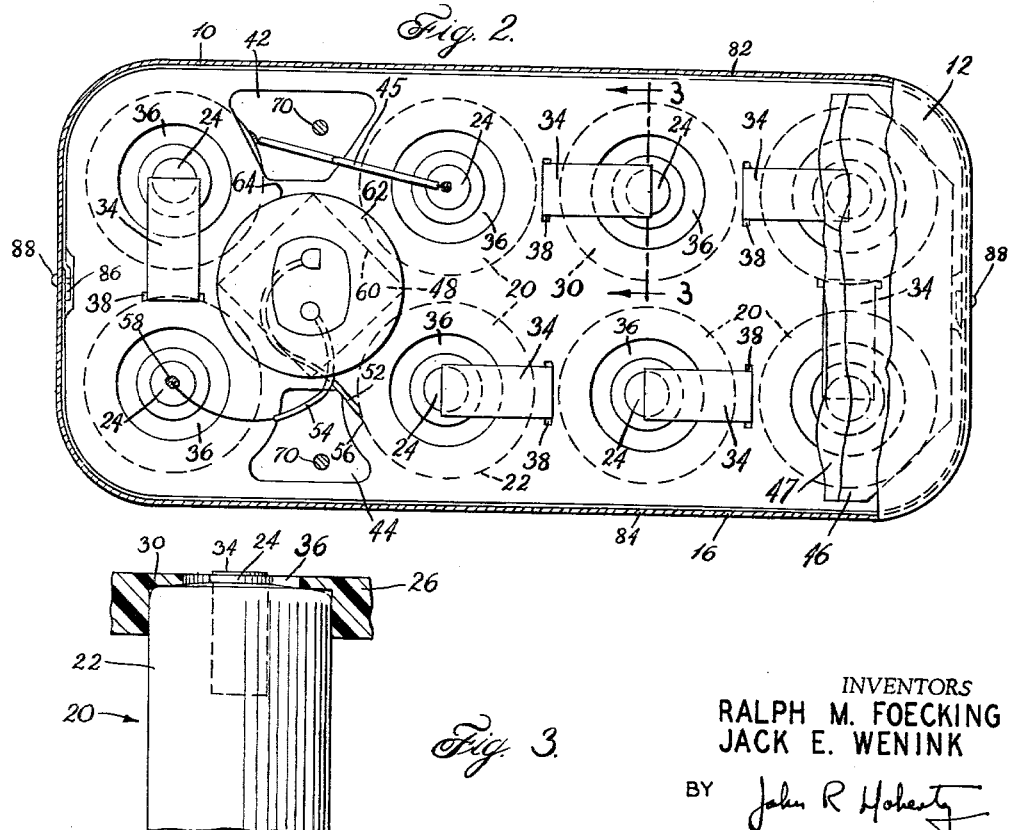
INVENTORS
RALPH M. FOECKING
JACK E. WENINK
BY
ATTORNEY Nov. 23, 1965 R. M. FOECKING ETAL 3,219,485
PORTABLE POWER PACK OF RECHARGEABLE ALKALINE BATTERIES
Filed Dec. 21, 1962 2 Sheets-Sheet 2
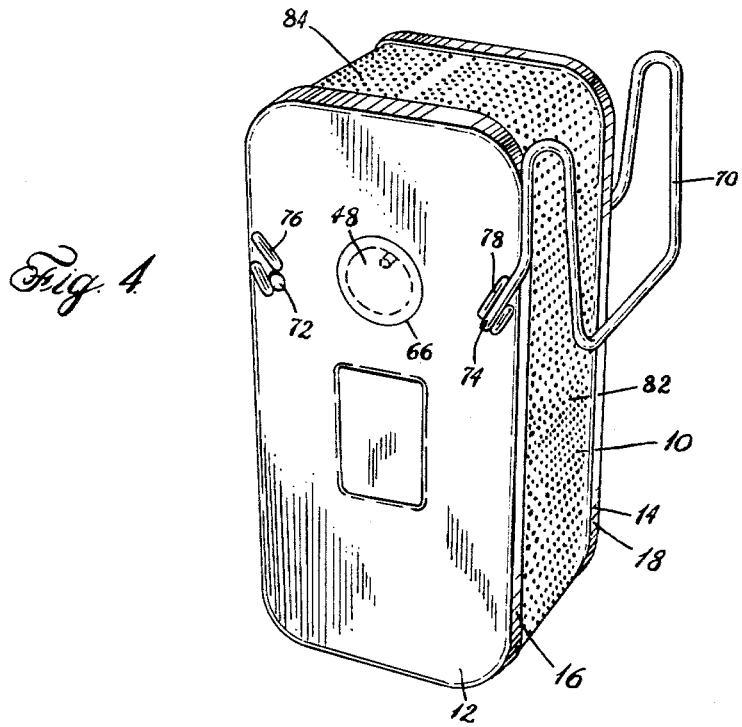
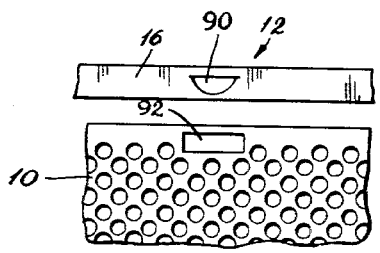
INVENTORS.
RALPH M. FOECKING
BY JACK E. WENINK
ATTORNEY

United States Patent Office 3,219,485
Patented Nov. 23, 1965

3,219,485
PORTABLE POWER PACK OF RECHARGEABLE ALKALINE BATTERIES
Ralph M. Foecking, Rocky River, and Jack E. Wenink, Olmsted Falls, Ohio, assignors to Union Carbide Corporation, a corporation of New York
Filed Dec. 21, 1962, Ser. No. 246,877
8 Claims. (Cl. 136—1)

This invention relates generally to batteries of the rechargeable alkaline type. More specifically, it pertains to a portable power pack of rechargeable alkaline batteries for supplying power to a portable electric appliance, such as one of a variety of portable electric tools for use both in the household and industry.

With the development of sealed, high rate, rechargeable alkaline batteries, it has become practical to manufacture a variety of portable battery-operated appliances of the type which may be conveniently held in the hand of the operator during use, as for example portable electric drills, saws and the like. A number of these appliances are capable of operation on a relatively small amount of power, such as that produced by a pair of conventional "D" size rechargeable alkaline batteries, and in such appliances, it is convenient to combine the appliance and the batteries in a single package. However, in those appliances requiring a larger power source and hence a greater number of batteries, it is not altogether practical to incorporate the batteries in the appliance since its size and weight is greatly increased to the point where it becomes inconvenient and difficult for the operator to handle the appliance.

The invention contemplates a portable power pack of rechargeable alkaline batteries for supplying power to a portable electric appliance, particularly of the type which requires a large power source for its operation. The portable power pack may be conveniently carried on the person of the operator and is provided with terminal means for connecting the batteries to the appliance, suitably by means of an electric cord.

It is the primary object of the invention to provide a portable power pack of the character described.

Another object is a portable power pack which is provided with means for ventilating the batteries and for dissipating heat which is normally developed when the batteries are recharged or subjected to a heavy discharge.

Still another object is a portable power pack which is adaptable to use with rechargeable alkaline batteries of most any size and capacity.

A further object is a portable power pack which is easy to assemble and economical to manufacture.

Other objects and advantages of the invention will become apparent from the following description, taken in conjunction with the accompanying drawings, wherein:

FIG. 1 is an elevational view, partially broken away, of a portable power pack embodying the invention;

FIG. 2 is a plan view, partially broken away, of the portable power pack illustrated in FIG. 1;

FIG. 3 is a sectional view taken along the line 3—3 in FIG. 2;

FIG. 4 is a perspective view of the portable power pack illustrating means for carrying the pack on the person; and FIG. 5 is a fragmentary view illustrating an arrangement for assembling the body of the portable power pack.

Referring now to the drawings and particularly to FIGS. 1 and 4, a portable power pack embodying the invention comprises a substantially rectangular body portion in the form of a perforated casing 10 having top and bottom covers 12, 14. The top and bottom covers 12, 14 have flanged peripheral edges 16, 18 which fit tightly over the side walls of the casing 10. The casing 10 and both the top and bottom covers 12, 14 are suitably made of metal, as for example, stainless steel sheet.

Within the casing 10 are a plurality of sealed, high rate, rechargeable alkaline batteries as indicated at 20. These batteries are of a conventional type, each having a cylindrical polarized container 22 constituting the negative terminal thereof, and a positive terminal 24 at the top. To support the batteries in the casing 10, a pair of substantially flat holder plates 26, 28 are provided, one at the top and the other at the bottom of the casing 10. These holder plates 26, 28 have a plurality of circular recesses 30, 32, which are shown in dotted lines in FIGS. 1 and 2, for receiving the batteries at the respective ends thereof. Both of the holder plates 26, 28 are composed of an insulating material, suitably a molded plastic such as high density polyethylene.

The batteries 20 are connected in series by a plurality of conductive strips 34 which are suitably made of metal, and which are formed in a substantially L-shaped fashion having one leg thereof overlying the top holder plate 26. As best illustrated in FIG. 3, the positive terminal 24 of each of the batteries passes through one of a plurality of apertures 36 which are coincident with the larger diameter recesses 30, and engages the overlying leg of one of the conductive strips 34. To complete the connection, the other leg of each conductive strip 34 passes through one of a plurality of rectangular slots 38 to the interior of the assemblage, where it is secured to the cylindrical container 22 of one of the adjacent batteries as indicated at 40, suitably by soldering or welding. For purposes to be hereinafter explained, a pair of larger openings 42, 44 are provided adjacent to the peripheral edges of the top holder plate 26, and positioned through one of these openings is an insulated wire 45 which similarly connects two adjacent batteries as illustrated. An insulating board 46 which may be composed of a phenolic resin impregnated paper is provided beneath the top cover 12, together with a soft insulating pad 47 of fiberglass, both of which serve to insulate the conductive strips 34 and the positive terminals 24 of the batteries. The insulating pad 47 additionally serves to provide some resiliency in the assemblage, thereby protecting the batteries 20 against damage in the event the portable power pack is accidentally dropped or otherwise subjected to severe conditions of shock.

The portable power pack is provided with an electrical socket 48 for receiving a conventional type of plug which is attached to the electric cord leading from the appliance. In the embodiment illustrated, the electrical socket 48 comprises a substantially square body 50 which is supported in the assemblage and which carries a pair of insulated lead wires 52, 54. These lead wires 52, 54 connect the electrical socket 48 to the batteries 20, one of which is secured to the cylindrical container 22 and the other of which is secured to the positive terminal 24 of two adjacent batteries as shown at 56, 58, also suitably by soldering or welding.

The socket 50 is fitted through a square opening 60 provided in the top holder plate 26 as illustrated in dotted lines in FIG. 2, and is supported within the assemblage by a generally circular rim 62 which is seated in a shallow recess indicated at 64. As shown in FIG. 4, the top cover 12 has a circular opening 66 which coincides with a pair of openings in both the insulating board 46 and pad 47, thereby providing access to the electrical socket 48. Although not illustrated, the peripheral edges of the opening 66 may be formed inwardly to bear against the circular rim 62, thus to aid in retaining the electrical socket 48 in position. With the construction described, it will be observed that the electrical socket 48 is prevented from rotating and is firmly held and maintained within the assemblage.

An important feature of the invention resides in the provision of means for ventilating the batteries 20, especially when the batteries are recharged or subjected to heavy discharge. Such means may be provided by the illustrated arrangement on both the top and bottom holder plates 26, 28 and the perforated metal casing 10. As will be seen particularly in FIG. 2, the circular recesses 30, 32 are so positioned and arranged as to support the batteries 20 in spaced apart relation, thereby providing a series of continuous open paths between and around the batteries. Thus, any heat which the batteries 20 may develop when recharged, or during heavy discharge, is easily dissipated through these open paths and the perforations in the casing 10.

Surrounding the batteries 20 is an open, plastic bonded, fiberglass, insulating screen 68 which may be positioned freely within the assemblage or attached to both of the top and bottom holder plates 26, 28, suitably by a plastic bond. The screen 68 serves the purpose of insulating the batteries 20 from the perforated metal casing 10, as for example in the event the casing 10 is squeezed or dented during use. The open structure of the screen 68 is essential in order to permit the passage of air for ventilating the batteries 20.

The portable power pack further includes a bail 70 of stainless steel, for example, the embodiment illustrated in FIG. 4 being particularly adapted for hanging the pack on the belt of the operator. To attach the bail 70, a double set of apertures is provided in both of the covers 12, 14 for receiving the bail 70 at the ends thereof, the apertures for the top cover 12 being indicated at 72, 74. The purpose of the double set of apertures is to enable the operator to carry the portable power pack on either side of the body, while at the same time positioning the electrical socket 48 in a desired direction. To prevent the pack from swinging and to aid in attaching the bail 70, a pair of elongated detents may be provided adjacent to the apertures as shown at 76, 78.

With reference to FIG. 2, it will be seen that the large openings 42, 44 in the top holder plate 26 provide adequate space within the assemblage for receiving the ends of the bail 70 without interfering with any of the component parts of the portable power pack. Although not clearly indicated, a pair of large openings are also provided in the bottom holder plate 28 for the same purpose. As shown in the drawing, these openings may be so configurated as to permit the ends of the bail 70 to be inserted at a slight angle, thereby facilitating its attachment. It will also be observed that by providing the insulated wire 45 in the opening 42, there is no chance for the bail 70 to short-circuit the series connected batteries 20.

The provision of the bail 70 generally increases the flexibility of the portable power pack in several respects. Thus, it is possible to wear the portable power pack on the person or it may be placed down on a near-by object which is close to the appliance. Since the bail 70 can be attached to either side of the casing 10, the portable power pack is easily adaptable to a "right or left-handed person." Also, by eliminating the elongated detents 76, 78, the portable power pack can be freely pivoted on the bail 70, whereby the pack more readily adjusts itself to the motions of the operator resulting in greater comfort. It will of course be apparent that a number of hangers of different configurations may be employed, among which may include:

(1) A loop or ring by which the portable power pack could be hung on a hook or other object.

(2) A handle suitable for hand carry.

(3) An open hook suited for hanging the portable power pack on a pipe, rod, limb, bar or the like.

An additional feature of the portable power pack resides in its adaptability to use with a number of portable electric appliances of different types whereby only a single power source is required for operating the appliances, thus resulting in a considerable savings in cost to the operator.

In the preferred construction of the portable power pack, the casing 10 is formed of two substantially U-shaped perforated metal half shells 82, 84 which are joined together at the ends thereof. As shown in FIG. 2, one end of each half shell 82, 84 is offset as at 86, providing a relatively smooth continuous joint which is secured together suitably by locking screws 88. With this construction, it will be seen that the casing 10 is easily assembled, and may be easily disassembled for replacement of the half shells 82, 84 which are the only parts requiring interchange when battery cells of different lengths are to be used.

To assemble the covers 12, 14, a series of barbs 90 may be provided on the flanged peripheral edges 16, 18 as shown in FIG. 5. These barbs 90 engage an equal number of rectangular slots 92 in the casing half shells 82, 84. Thus, the covers 12, 14 may be easily snapped into place during assembly of the portable power pack.

What is claimed is:

1. A portable power pack of the type capable of being carried on the body of a person comprising, in combination, a body including a substantially rectangular perforated metal casing, a top cover and bottom cover, each of said covers having flanged peripheral edges fitting over the side walls of said perforated metal casing, a plurality of sealed rechargeable alkaline batteries in said body; a pair of substantially flat insulating holder plates, one of each of which is positioned at an end of said perforated metal casing, battery receiving means formed in said holder plates holding said batteries at the respective ends thereof and positioning said batteries in spaced apart relation, said spacings in conjunction with said perforated metal casing providing for ventilation of said batteries and the dissipation of heat which is normally developed when said batteries are recharged or subjected to heavy discharge; insulating means of an open structure disposed between said casing and the sides of said batteries; electrical terminal means associated with said cover for connection to an electric cord leading from an appliance to be supplied with electric power; and means for supporting and carrying said portable power pack.

2. A portable power pack of the type capable of being carried on the body of a person comprising, in combination, a body including a substantially rectangular perforated metal casing, a top cover and bottom cover, each of said covers having flanged peripheral edges fitting over the side walls of said perforated metal casing; a plurality of generally cylindrical, sealed rechargeable alkaline batteries in said body; a pair of substantially flat insulating holder plates, one of each of which is positioned at an end of said perforated metal casing, said holder plates having therein a plurality of circular recesses adapted to receive said batteries at the respective ends thereof and to position said batteries in spaced apart relation, said spacings in conjunction with said perforated metal casing providing for ventilation of said batteries and the dissipation of heat which is normally developed when said batteries are recharged or subjected to heavy discharge; insulating means of an open structure disposed between said casing and the sides of said batteries; electrical terminal means associated with said cover for connection to an electric cord leading from an appliance to be supplied with electric power; and means for supporting and carrying said portable power pack.

3. A portable power pack of the type capable of being carried on the body of a person comprising, in combination, a body including a substantially rectangular perforated metal casing, a top cover having an opening therein and a bottom cover, each of said covers having flanged peripheral edges releasably fitting over the side walls of said perforated metal casing; a plurality of generally cylindrical sealed rechargeable alkaline batteries in said body, each of said batteries having a cylindrical container constituting one terminal and another terminal at the top thereof; a pair of substantially flat insulating holder plates, one of each of which is positioned at an end of said perforated metal casing, said insulating holder plates having therein a plurality of circular recesses adapted to receive said batteries at the respective ends thereof and to position said batteries in spaced apart relation, said spacings in conjunction with said perforated metal casing providing for ventilation of said batteries and the dissipation of heat which is normally developed when said batteries are recharged or subjected to heavy discharge; means for electrically connecting the terminals of said batteries; an insulating screen disposed between said casing and the sides of said batteries; an electric socket connected to said batteries and mounted in one of said insulating holder plates and positioned in direct line with said opening in said cover, whereby said socket is adapted to receive a plug attached to an electric cord leading from an appliance which is to be supplied with electric power; and means for supporting and carrying said portable power pack.

4. A portable power pack of the type capable of being carried on the body of a person comprising, in combination, a body including a substantially rectangular perforated metal casing, a top cover having an opening therein and a bottom cover, each of said covers having flanged peripheral edges releasably fitting over the side walls of said perforated metal casing; a plurality of generally cylindrical, sealed rechargeable alkaline batteries in said body, each of said batteries having a cylindrical container constituting the negative terminal and a positive terminal in the top thereof; a pair of substantially flat insulating holder plates, one of which is positioned at the top and the other of which is positioned at the bottom of said perforated metal casing, both of said insulating holder plates having therein a plurality of circular recesses adapted to receive said batteries at the respective ends thereof and to position said batteries in spaced apart relation, said spacings in conjunction with said perforated metal casing providing for ventilation of said batteries and the dissipation of heat which is normally developed when said batteries are recharged or subjected to heavy discharge; said top insulating holder plate having a plurality of apertures therein concentric with said circular recesses for receiving the positive terminals of each of said batteries; a plurality of substantially L-shaped conductive strips for electrically connecting said batteries, one leg of each of which overlies said top insulating holder plate for engaging the positive terminal of one of said batteries, and the other leg of each of which is secured in electric contact with the cylindrical container of one of the adjacent batteries and an insulating screen disposed between said casing and the sides of said batteries; an electric socket connected to said batteries and mounted in said top insulating holder plate and positioned in direct line with said opening in said top cover, whereby said electric socket is adapted to receive a plug attached to an electric cord leading from an appliance to be supplied with electric power; and means for supporting and carrying said portable power pack.

5. The portable power pack of claim 4 wherein insulating means are provided beneath said top cover for electrically insulating said conductive strips and the positive terminals of said batteries.

6. The portable power pack of claim 4 wherein said supporting means comprises a bail of a configuration adapted to carrying said pack on the belt of the operator.

7. The portable power pack of claim 6 wherein apertures are provided in said top and bottom covers for receiving said bail and for mounting said bail on either side of said pack.

8. The portable power pack of claim 4 wherein the peripheral edges of said top and bottom covers are provided with a series of barbs for engaging slots provided in the side walls of said perforated metal casing.

References Cited by the Examiner
UNITED STATES PATENTS

| | | | |
|---|---|---|---|
| 1,036,063 | 8/1912 | Bedell et al. | 136—180 |
| 1,313,513 | 8/1919 | Bedell | 136—180 |
| 1,512,313 | 10/1924 | Rowe | 136—167 |
| 2,096,376 | 10/1937 | Lauppe | 224—5 |
| 2,746,002 | 5/1956 | Robillard | 320—2 |
| 2,832,815 | 4/1958 | Bremer et al. | 136—170 |
| 2,978,596 | 4/1961 | Robirds | 307—151 |
| 3,027,507 | 3/1962 | Hubner | 320—2 |

WINSTON A. DOUGLAS, *Primary Examiner.*

MURRAY TILLMAN, JOHN H. MACK, *Examiners.*